(No Model.)

O. NOACK.
VISE.

No. 422,613. Patented Mar. 4, 1890.

WITNESSES:

INVENTOR
Otto Noack
BY
ATTORNEYS

UNITED STATES PATENT OFFICE.

OTTO NOACK, OF STAMFORD, CONNECTICUT.

VISE.

SPECIFICATION forming part of Letters Patent No. 422,613, dated March 4, 1890.

Application filed December 11, 1889. Serial No. 333,356. (No model.)

*To all whom it may concern:*

Be it known that I, OTTO NOACK, of Stamford, in the county of Fairfield and State of Connecticut, a citizen of the United States, have invented certain new and useful Improvements in Vises, of which the following is a specification.

The object of my invention is to provide a new and improved vise which can be adjusted, locked, and released very easily and rapidly, and can be used for holding large and small objects.

The invention consists in the construction and combination of parts and details, as will be fully described hereinafter, and finally pointed out in the claims.

Figure 1:
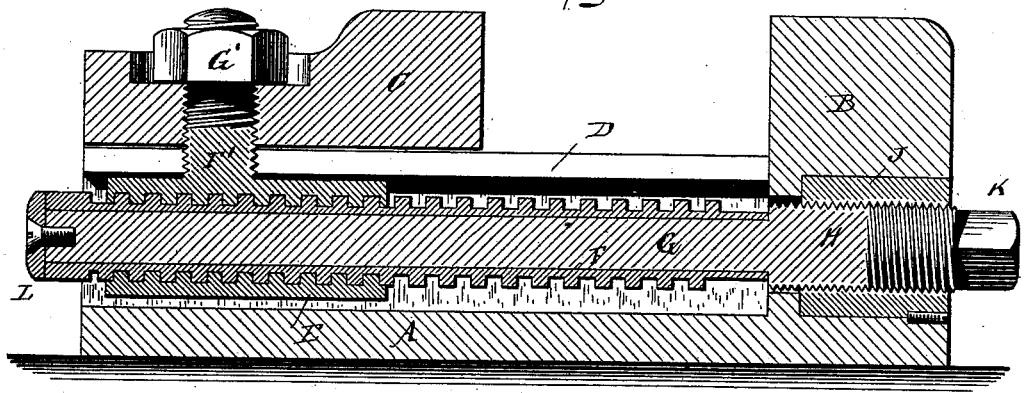
Figure 2:
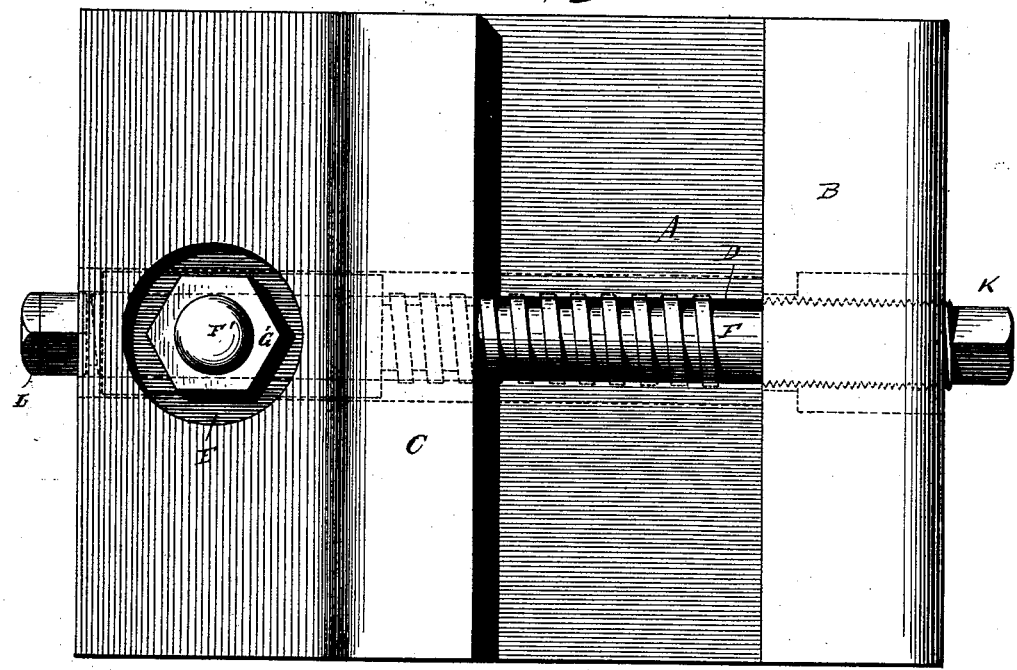
Figure 3:
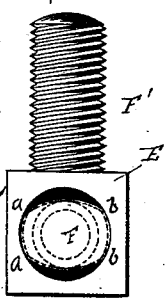
Figure 4:
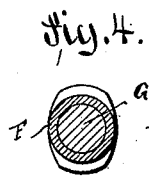
Figure 5:
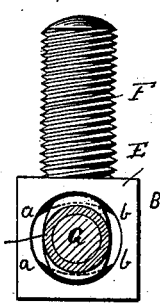

In the accompanying drawings, Figure 1 is a vertical longitudinal sectional view of my improved vise. Fig. 2 is a plan view of the same. Fig. 3 is an end view of the sliding sleeve. Fig. 4 is a cross-sectional view of the tubular spindle and the solid spindle in the same. Fig. 5 is an end view of the sliding sleeve and a cross-section of the spindles.

Similar letters of reference indicate corresponding parts.

The bed A is provided with a fixed upwardly-projecting jaw B and with a sliding jaw C, which may be moved toward and from the fixed jaw. Said vise is also provided with a groove D, in which the sleeve E is mounted to slide, said sleeve being provided with an upwardly-projecting pintle F', which is passed through an aperture in the sliding jaw C, the sliding jaw being locked on the pintle by means of a nut G'. Said sleeve is provided with an interior heavy screw-thread, which is cut out at both sides between the points $a$ $a$ $b$ $b$, leaving the screw-thread at the top and bottom only.

A tubular spindle F is passed through the sleeve, said tubular spindle being provided with an exterior screw-thread adapted to engage the screw-thread of the sleeve E, and said screw-thread on the tubular spindle appearing at diametrical opposite points only, as shown in Fig. 4. Through the tubular spindle F a solid spindle G is passed, which has a screw-threaded part H, mounted to turn in a threaded bushing J, held in the fixed jaw B, the outer end of said spindle being provided with a square head K for receiving the key; or any other appliance may be used for turning said spindle. The solid spindle is provided at the opposite end with a head L, resting against the end of the tubular spindle F. To adjust the jaw C, so that the same can be moved readily toward or from the fixed jaw B, the tubular spindle F is turned by means of a suitable implement applied on that end adjacent to the head L of the fixed spindle in such a manner that the thread on the tubular spindle F does not engage the thread $o$ on the sleeve E—that is to say, said tubular spindle is so adjusted that its longer transverse axis coincides with the transverse axis of the sleeve E, as shown in Fig. 3. The threads of the tubular spindle F and sleeve E are thus disengaged, and the jaw C can be moved away from or toward the jaw B as much as may be necessary. Then a half-turn is given to the tubular spindle F, whereby its thread is engaged with the thread of the sleeve E, as shown in Fig. 5. If now the spindle G is turned the same will be moved in the direction toward or from the head B, and as the end of the tubular spindle F rests against the head L of the solid spindle G said tubular spindle F, and with it the sleeve E and jaw C, may be moved toward or from the fixed jaw B. The movable jaw C can thus be adjusted very easily and rapidly to rest against the object to be held, and, after turning said spindle half-way round in the manner described and turning the solid spindle G, said jaw C can be pressed firmly against the article to be held, and said article is pressed against the fixed jaw B.

Having thus described my invention, I claim as new and desire to secure by Letters Patent—

1. In a vise, the combination, with a fixed jaw and a movable jaw, of a sleeve connected with the movable jaw and having an internal screw-thread, parts of which are cut away, a tubular spindle passed through said sleeve and provided with an exterior screw-thread, parts of which are cut away, and a solid screw-spindle passed through the tubular screw-spindle and engaging the same and also passing through the fixed jaw and engaging a thread in an aperture in the same, substantially as set forth.

2. In a vise, the combination, with a fixed jaw and a movable jaw, of a sleeve provided with an interior screw-thread, parts of which are cut away, a tubular spindle passed through the sleeve and also provided with a screw-thread, parts of which are cut away, and a solid screw-spindle passed through the tubular spindle and the fixed jaw and having a screw-thread that engages a thread in the aperture of the fixed jaw, said screw-spindle being provided with a head resting against the end of the tubular spindle, substantially as set forth.

In testimony that I claim the foregoing as my invention I have signed my name in presence of two subscribing witnesses.

OTTO NOACK.

Witnesses:
A. A. HEUGH,
FR. BERG.